United States Patent [19]

Dilluvio et al.

[11] Patent Number: 5,755,467
[45] Date of Patent: May 26, 1998

[54] LATCHING AND SWITCH OPERATING SYSTEM FOR A CONVERTIBLE ROOF

[75] Inventors: Christopher J. Dilluvio, Warren; Kim E. Taylor, Farmington Hills, both of Mich.

[73] Assignee: ASC Incorporated, Southgate, Mich.

[21] Appl. No.: 381,121

[22] Filed: Jan. 31, 1995

[51] Int. Cl.$^6$ ......................................................... E05C 9/00
[52] U.S. Cl. ............................ 292/32; 292/39; 292/DIG. 5
[58] Field of Search ................................ 292/32, 39, 121, 292/63, 68, 157, 160, DIG. 5

[56] References Cited

U.S. PATENT DOCUMENTS

| | | |
|---|---|---|
| 1,056,333 | 3/1913 | Hill . |
| 1,174,366 | 3/1916 | Van Den Plas . |
| 1,269,311 | 6/1918 | Rixon . |
| 1,831,494 | 11/1931 | Hynes et al. . |
| 1,856,531 | 5/1932 | Berg . |
| 1,892,512 | 12/1932 | Kemp . |
| 1,905,814 | 4/1933 | Orlow . |
| 1,929,371 | 10/1933 | Hamilton . |
| 2,007,873 | 7/1935 | Paulin . |
| 2,201,330 | 5/1940 | Wernig et al. . |
| 2,360,524 | 10/1944 | Simpson . |
| 2,468,251 | 4/1949 | Wiederman . |
| 2,486,905 | 11/1949 | Ackermans . |
| 2,560,459 | 7/1951 | Lundberg et al. . |
| 2,570,260 | 10/1951 | Milhan . |
| 2,570,261 | 10/1951 | Milhan . |
| 2,586,648 | 2/1952 | Hale et al. . |
| 2,674,480 | 4/1954 | Vigmostad . |
| 2,709,621 | 5/1955 | Votypka et al. . |
| 2,741,503 | 4/1956 | Thompson, III . |
| 2,753,202 | 7/1956 | Smith et al. . |
| 2,785,914 | 3/1957 | Thomas et al. . |
| 2,831,718 | 4/1958 | Hallek et al. . |
| 2,852,292 | 9/1958 | Galla . |
| 2,879,988 | 3/1959 | Klisch . |
| 2,916,327 | 12/1959 | Gilson . |
| 3,089,719 | 5/1963 | Csizmansky . |
| 3,151,375 | 10/1964 | Schevenell ............................ 27/16 |

(List continued on next page.)

FOREIGN PATENT DOCUMENTS

| | | |
|---|---|---|
| 0188774 | 12/1985 | European Pat. Off. . |
| 0492006 | 12/1990 | European Pat. Off. . |
| 805229 | 5/1951 | Germany . |
| 1505721 | 7/1970 | Germany . |
| 352786 | 7/1931 | United Kingdom . |
| 536578 | 5/1941 | United Kingdom . |

OTHER PUBLICATIONS

Drawing of Mitsubishi Header Latch prior to Jan. 31, 1995.
Manual of Latch Handle and Lock Assembly used in a convertible roof for the Geo Metro (on or before 1992).
Drawings of latch assembly used in a convertible roof for a Geo Tracker (on or before 1992).

*Primary Examiner*—Rodney M. Lindsey
*Attorney, Agent, or Firm*—Harness, Dickey & Pierce, P.L.C.

[57] ABSTRACT

A convertible roof latching and switch operating system provides an actuator which moves a first latch toward a vehicle centerline and a second latch away from a vehicle centerline in order to engage their respective strikers. In another aspect of the present invention a movable handle is directly and mechanically coupled to the pair of latches. In a further aspect of the present invention, the handle also operates one or more switches which activate driving means for raising or lowering a convertible roof.

39 Claims, 8 Drawing Sheets

U.S. PATENT DOCUMENTS

| | | | |
|---|---|---|---|
| 3,353,864 | 11/1967 | Antaya et al. | |
| 3,362,740 | 1/1968 | Burns | 292/34 |
| 3,400,562 | 9/1968 | Bloss | |
| 3,425,742 | 2/1969 | Rauber, Jr. | |
| 3,443,834 | 5/1969 | Andres | 292/121 |
| 3,586,360 | 6/1971 | Perrotta | 292/97 |
| 3,751,949 | 8/1973 | Castle | 270/144 |
| 3,845,976 | 11/1974 | Peterson | 292/158 |
| 3,891,252 | 6/1975 | Lehmann | 292/DIG. 5 X |
| 4,439,649 | 3/1984 | Cecchi | 200/6 |
| 4,470,277 | 9/1984 | Uyeda | 70/118 |
| 4,537,440 | 8/1985 | Brockway et al. | 296/108 |
| 4,618,180 | 10/1986 | Muscat | 296/120 |
| 4,664,436 | 5/1987 | Eyb | 292/121 |
| 4,702,505 | 10/1987 | Alexander | |
| 4,720,133 | 1/1988 | Alexander et al. | 296/117 |
| 4,746,163 | 5/1988 | Muscat | 296/120 |
| 4,801,173 | 1/1989 | Trenkler | |
| 4,817,999 | 4/1989 | Drew | 292/113 |
| 4,819,983 | 4/1989 | Alexander | 292/DIG. 5 X |
| 4,830,425 | 5/1989 | Muscat | 296/107 |
| 4,830,426 | 5/1989 | Schlachter et al. | 296/121 |
| 5,042,869 | 8/1991 | Brin | 296/121 |
| 5,046,767 | 9/1991 | Muscat | 292/34 |
| 5,058,939 | 10/1991 | Miilu | 292/110 |
| 5,064,241 | 11/1991 | Ohrle | 296/121 |
| 5,067,768 | 11/1991 | Fischbach | 296/107 |
| 5,085,483 | 2/1992 | Alexander | |
| 5,088,777 | 2/1992 | Ono et al. | 292/DIG. 5 X |
| 5,161,852 | 11/1992 | Alexander et al. | 296/108 |
| 5,186,516 | 2/1993 | Alexander et al. | 296/121 |
| 5,225,747 | 7/1993 | Helms et al. | 318/265 |
| 5,269,586 | 12/1993 | Hahn et al. | 292/DIG. 5 X |
| 5,301,987 | 4/1994 | Tokarz et al. | |
| 5,533,777 | 7/1996 | Kleemann et al. | 296/117 |

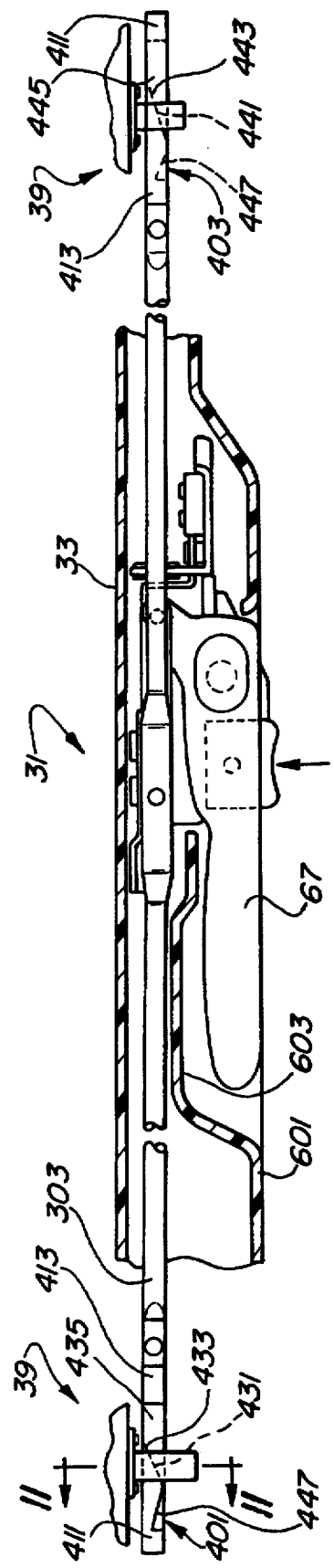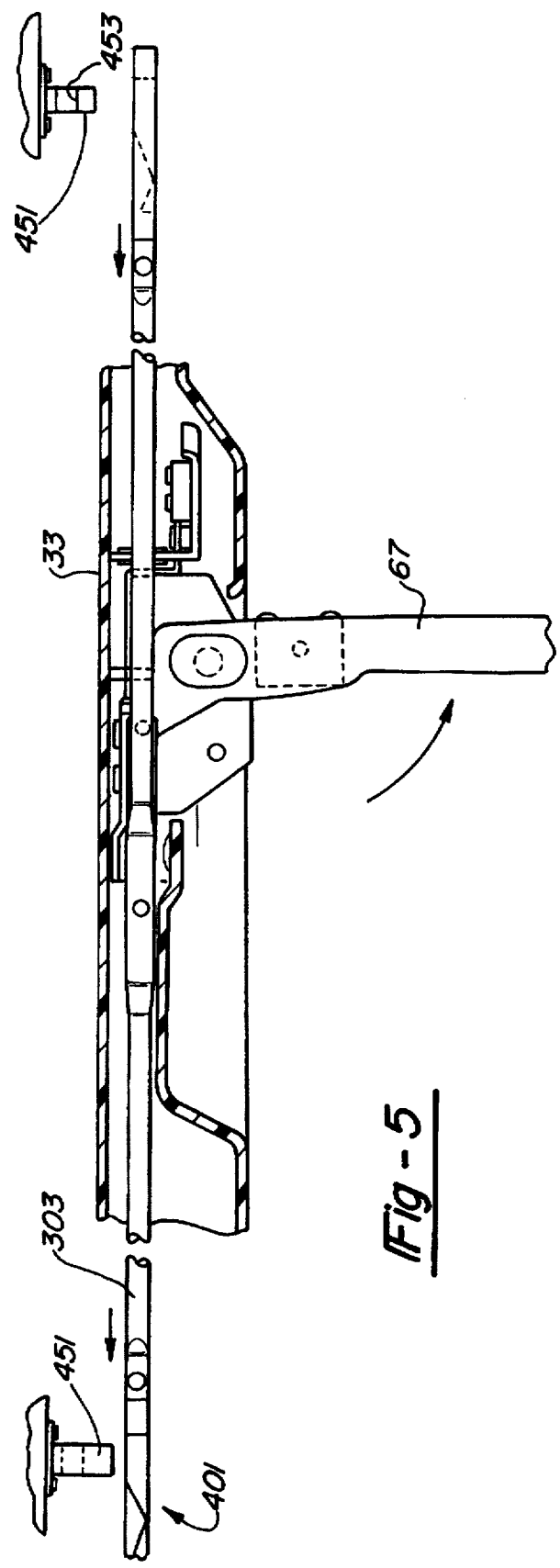
Fig-4
Fig-5

LATCHING AND SWITCH OPERATING SYSTEM FOR A CONVERTIBLE ROOF

BACKGROUND AND SUMMARY OF THE INVENTION

The invention relates generally to automotive convertible roofs and specifically to a latching and switch operating system for an automotive vehicle convertible roof.

It is common to employ a variety of latches to retain a convertible roof to a front header panel and tonneau cover of an automotive vehicle. The front header panel is a structural member extending crosscar above a windshield. The tonneau cover is a rigid member which pivotably covers a boot well between a rear seat and a trunk. Such conventional latches are often provided near the outboard corners of the front header and tonneau cover, and may either be moved by one or more manual handles, a central hydraulic unit or an electric motor. Examples of such constructions are disclosed within the following U.S. Pat. Nos. 5,301,987 entitled "Convertible Top Stack Latch" which issued to Tokarz et al. on Apr. 12, 1994; 5,085,483 entitled "Convertible Top Latching Mechanism" which issued to Alexander on Feb. 4, 1992; 5,042,869 entitled "Latching Arrangement for a Motor Vehicle Top" which issued to Brin on Aug. 27, 1991; 3,425,742 entitled "Locking Means for Locking the Top of a Convertible Automobile" which issued Rauber on Feb. 4, 1969; 2,916,327 entitled "Power Operated Convertible Top Header Latch" which issued to Gilson on Dec. 8, 1959; 2,785,914 entitled "Locking Mechanism for Convertible Top" which issued to Thomas et al. on Mar. 19, 1957; 2,709,621 entitled "Convertible Top Header Locking Mechanism" which issued to Votypka et al. on May 31, 1955; and, 2,360,524 entitled "Latch for Convertible Automobile Top" which issued to Simpson on Aug. 17, 1944. The disclosures of all these patents are incorporated by reference herewithin. The last six of the afore-referenced latching system patents appear difficult to operate, overly complicated, heavy, cumbersome to package, aesthetically displeasing and expensive to manufacture.

Furthermore, recent convertible roofs are remotely operable through use of a driver actuable, two-way rocker switch located on a center floor mounted console. Upon switch actuation, the convertible roof is raised or lowered by an electric motor or hydraulic actuated linkage system. However, these traditional roof actuation switches are operated independently from the front header latches. This has proven problematic when a vehicle driver depresses the roof opening switch without disengaging the convertible roof latches. When this occurs, the convertible roof driving motor attempts to retract the convertible roof without success which can lead to premature failure of the motor, linkage system, latches or fuses. Various parts may be loosened or destroyed by this incorrect operation. Even when parts are not damaged, this sequentially incorrect operation is annoying to the vehicle driver.

In accordance with the present invention, a preferred embodiment of a convertible roof latching system provides an actuator which moves a first latch toward a vehicle centerline and a second latch away from a vehicle centerline in order to engage their respective strikers. In another aspect of the present invention a pivotable handle is directly and mechanically coupled to the pair of latches. In a further aspect of the present invention, a handle of a switch operation system activates one or more switches which causes a convertible roof to be raised or lowered. In yet another aspect of the present invention, a front header mounted handle serves to operate a pair of switches which activate a pair of convertible roof latches.

The latching and switch operating system of the present invention is advantageous over traditional constructions since the present invention integrates activation of many different convertible roof functions into a single, multi-function, sequentially correct, driver accessible actuator. The present invention insures correct sequential operation of the latching and roof raising/lowering features through an easily accessible, simple to use and aesthetically pleasing device. Furthermore, the present invention is relatively inexpensive and easily packaged as compared to conventional systems. Additional advantages and features of the present invention will become apparent from the following description and appended claims, taken in conjunction with the accompanying drawings.

BRIEF DESCRIPTION OF THE DRAWINGS

FIG. 4 is a rear elevational view, taken partly in section, showing the preferred embodiment latching and switch operating system of the present invention of the prior figures, disposed in an engaged and latched position;

FIG. 5 is a rear elevational view, taken partly in section, showing the preferred embodiment latching and switch operating system of the present invention of the prior figures, disposed in a disengaged and unlatched position;

DETAILED DESCRIPTION OF THE PREFERRED EMBODIMENT

Figure 1:
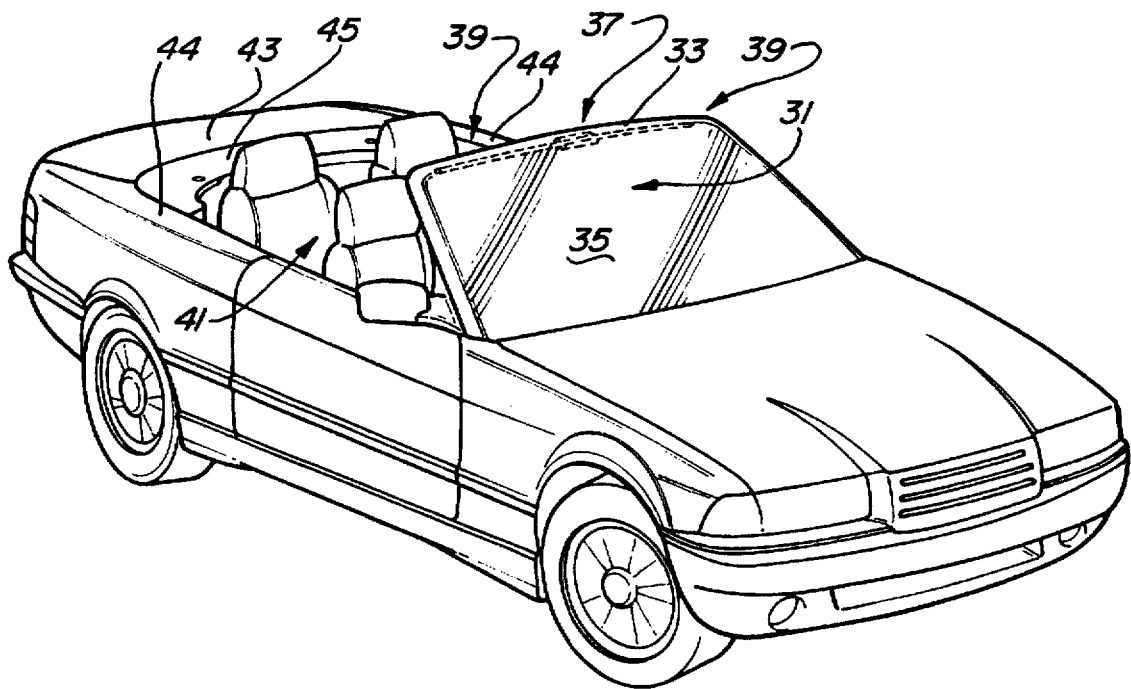
FIG. 1 is a perspective view showing an automotive vehicle employing a preferred embodiment latching and switch operating system of the present invention.
Figure 11:
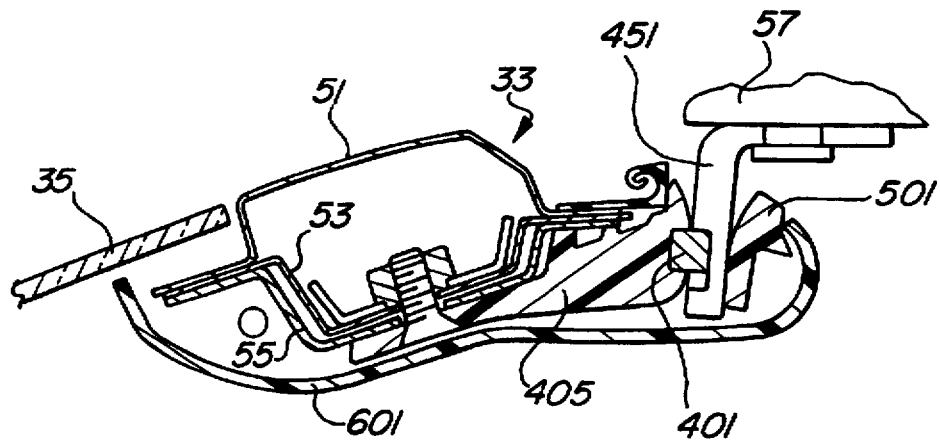
FIG. 11 is a sectional view, taken along line 11—11 of FIG. 4, showing an outboard portion of the preferred embodiment latching and switch operating system of the present invention of the prior figures, disposed in the engaged position.
Figure 12:
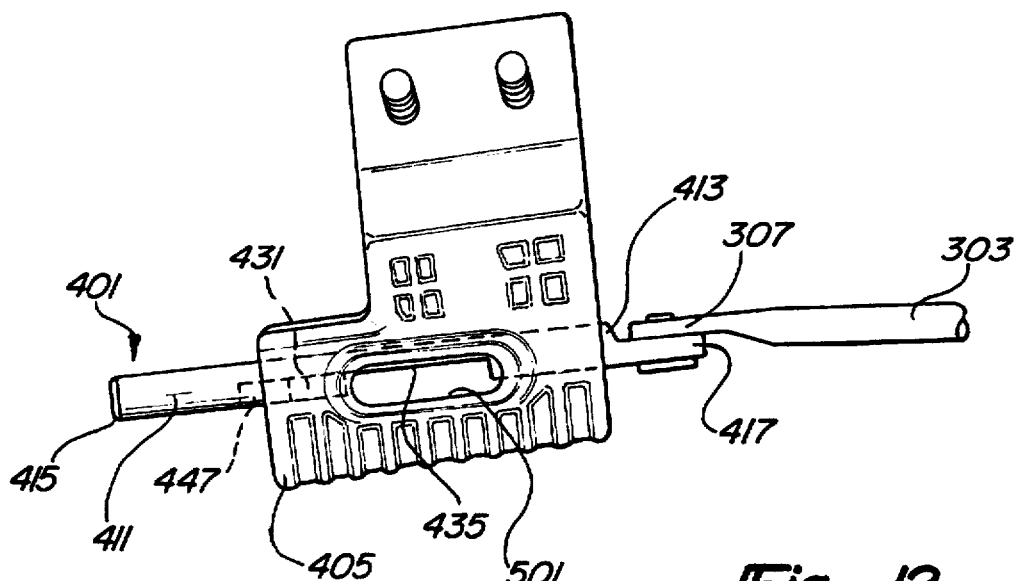
FIG. 12 is a top elevational view showing the outboard portion of the preferred embodiment latching and switch operating system of the present invention of the prior figures, disposed in the disengaged position.
Figure 13:
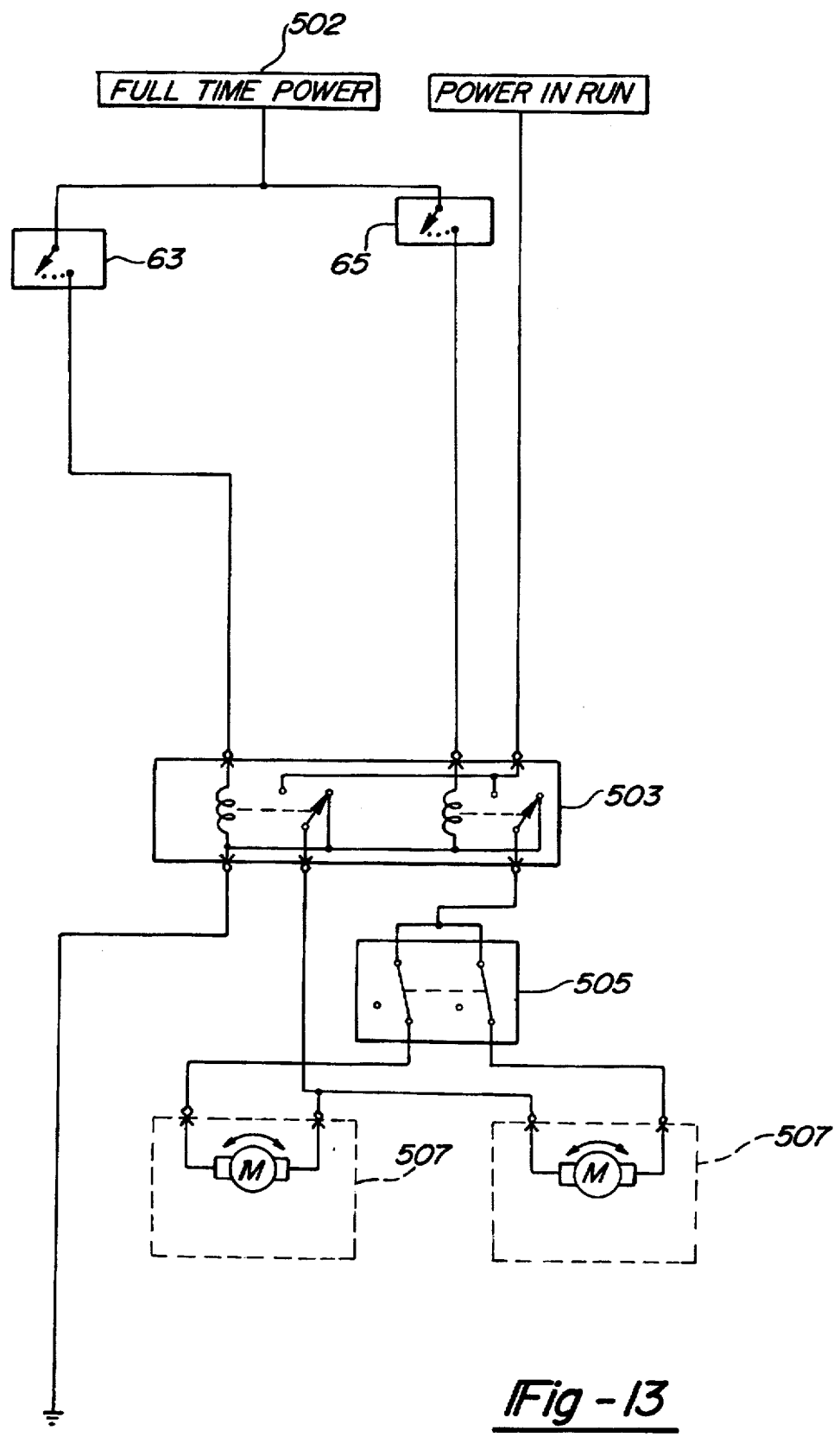
FIG. 13 is an electrical schematic diagram showing the preferred embodiment latching and switch operating system of FIGS. 1-9, 11 and 12.

An automotive vehicle having a lowered or stowed convertible roof is shown in FIG. 1. A preferred embodiment of a latching and switch operating system 31 of the present invention is shown mounted below a front header structural member 33. Front header 33 is located above a windshield 35 and between a pair of A pillars. Latching and switch operating system 31 has a central portion 37 mounted along a centerline of the vehicle, and a pair of outboard portions 39 disposed adjacent to the crosscar corners of front header 33. The automotive vehicle further has a passenger compartment 41, a trunk compartment covered by a trunk lid 43, quarter panels 44 and a boot well covered by a pivotable tonneau cover 45. A fixed tulip panel between the trunk lid and tonneau cover may also be used. FIG. 11 illustrates a front header 33 constructed from a sheet steel header outer panel 51, header inner panel 53 and header inner frame 55. Convertible roof 57 can be constructed as a soft top variety wherein fabric is stretched between a plurality of foldable roof bows, or a hard top variety wherein rigid outer panels span between structural side rails and crosscar bows. Examples of such convertible roofs are described and shown in the following U.S. Pat. Nos. 5,161,852 entitled "Convertible Top With Improved Geometry" which issued to Alexander et al. on Nov. 10, 1992; 5,106,145 entitled "Convertible Stack System" which issued to Corder on Apr. 21, 1992; 4,720,133 entitled "Convertible Top Structure" which issued to Alexander et al. on Jan. 19, 1988; and, 2,007,873 entitled "Vehicle Body Top Capable of being Stowed Away" which issued to Paulin on Jul. 9, 1935; the disclosures of all these patents are incorporated by reference herewithin.

Figure 2:
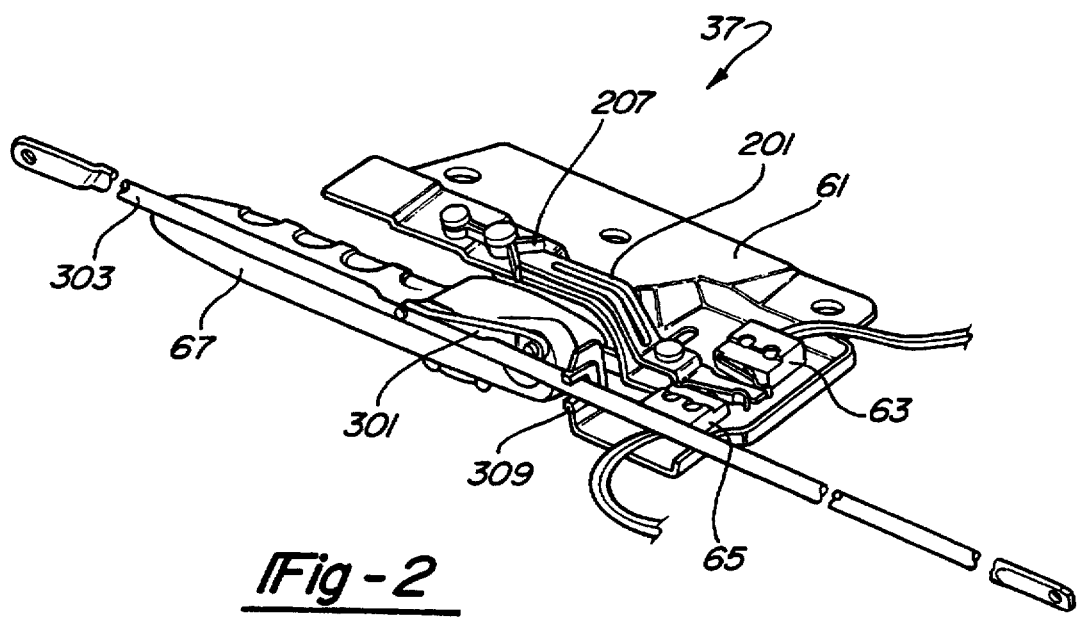
FIG. 2 is a perspective view, as seen from behind and above the vehicle, showing a central portion of the preferred embodiment latching and switch operating system of the present invention of FIG. 1.
Figure 3:
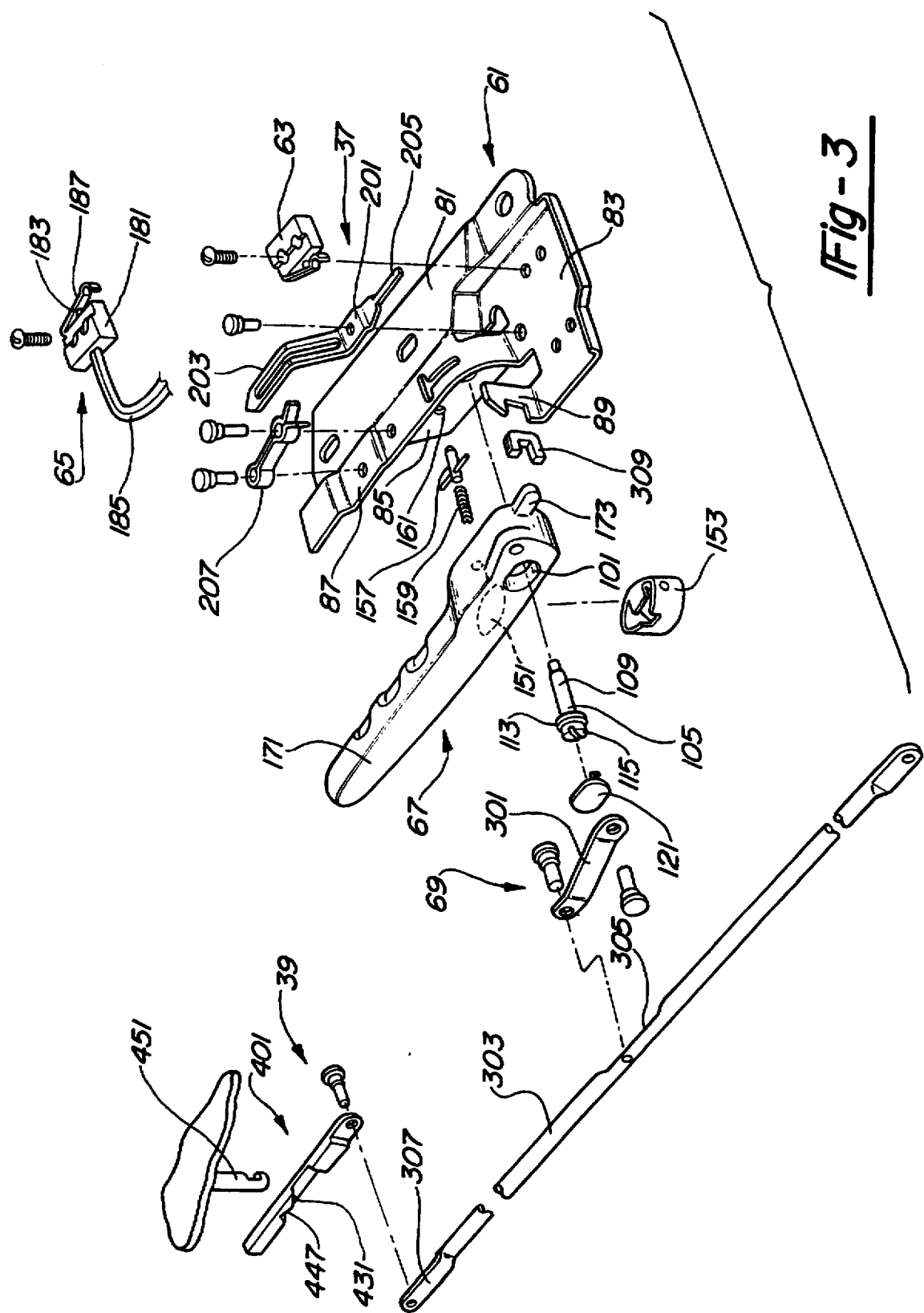
FIG. 3 is an exploded perspective view showing the preferred embodiment latching and switch operating system of the present invention of the prior figures.

Referring to FIGS. 2 and 3, the preferred embodiment of central portion 37 of the present invention latching and switch operating system 31 includes a stamped steel bracket 61, a pair of switches 63 and 65, a handle actuator 67 and a latch linkage device 69. Bracket 61 is a two piece weldment being further defined by a header mounting plate 81, a switch mounting plate 83, an upturned structure 85, a handle guide plate or return flange 87 and an isolator support 89. Header mounting plate 81 is riveted or bolted to the lower surface of front header 33.

Figure 8:
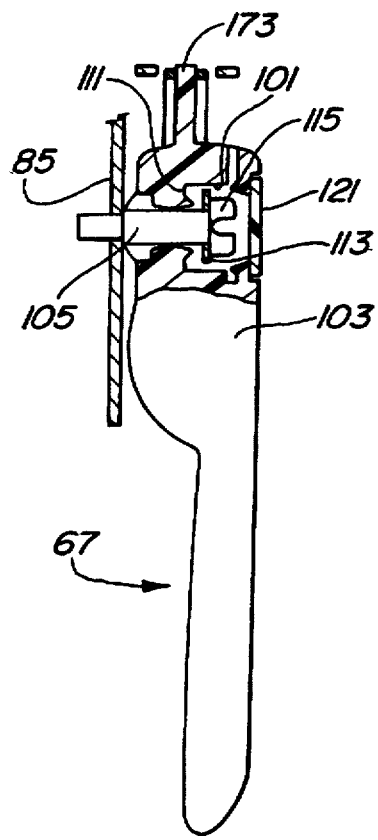
FIG. 8 is a side elevational view, taken partly in section, showing a handle of the preferred embodiment latching and switch operating system of the present invention of the prior figures, disposed in the vertical switch neutral position.
Figure 9:
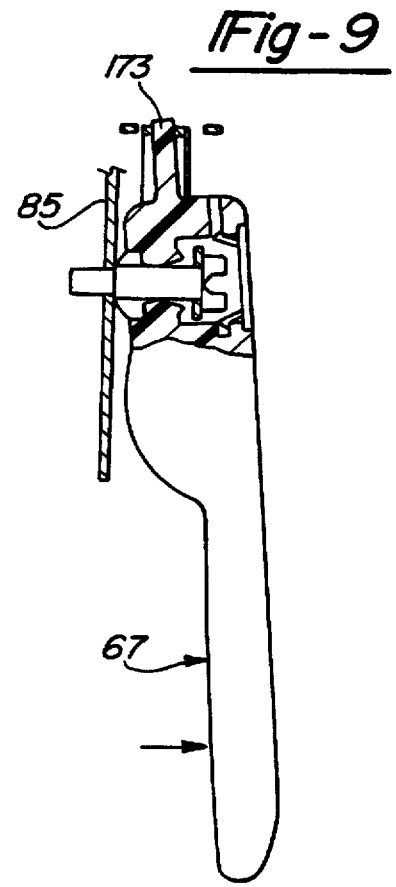
FIG. 9 is a side elevational view, taken partly in section, showing the handle of the preferred embodiment latching and switch operating system of the present invention of the prior figures, disposed in the switch operating position.

Handle 67 has a stepped passageway 101 running through a base 103 thereof. This can best be seen in FIGS. 3 and 8. A threaded bolt 105 extends through passageway 101 and is attached to upturned structure 85 of bracket 61. An injection molded plastic cap 121 aesthetically covers passageway 101. This arrangement allows handle 67 to pivot fore and aft between a forwardly pushed position (not shown), a vertically neutral position (FIG. 8) and a rearwardly pulled position (FIG. 9). Additionally, handle 67 can pivot in a crosscar manner about bolt 105 between a horizontally stowed latched position (FIG. 4) and the vertically neutral unlatched position (FIG. 5). A pair of beveled spring washers or a compression spring can alternately be positioned to surround a shank 109 of bolt 105 for compression between an internal shelf 111 of handle 67 and a washer 113 juxtapositioned beneath a bolt head 115.

Base 103 of handle 67 preferably has an orifice 151 within which fits an outwardly biased push button 153. Push button 153 is an injection molded plastic part which engages a T-shaped metallic locking pin 157. Locking pin 157 is biased by a compression spring 159 into an outwardly locking position whereby a tip thereof engages with an aperture 161 within bracket 61. These parts are best illustrated within FIG. 3. Depressing button 153 into handle 67 will cause locking pin 157 to retract from bracket 61 thereby allowing pivoting of handle 67. Handle 67 further has an elongated hand gripping segment 171 and a finger 173 extending opposite therefrom. Handle 67 is preferably injection molded from a high heat engineering grade plastic.

Figure 6:
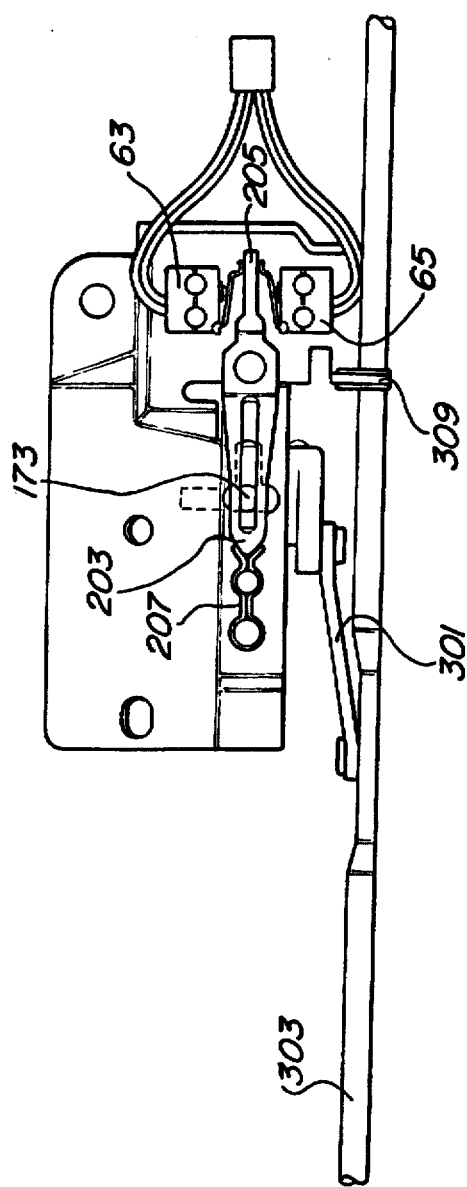
FIG. 6 is a top elevational view showing the central portion of the preferred embodiment latching and switch operating system of the present invention of the prior figures, disposed in a vertical switch neutral position.
Figure 7:
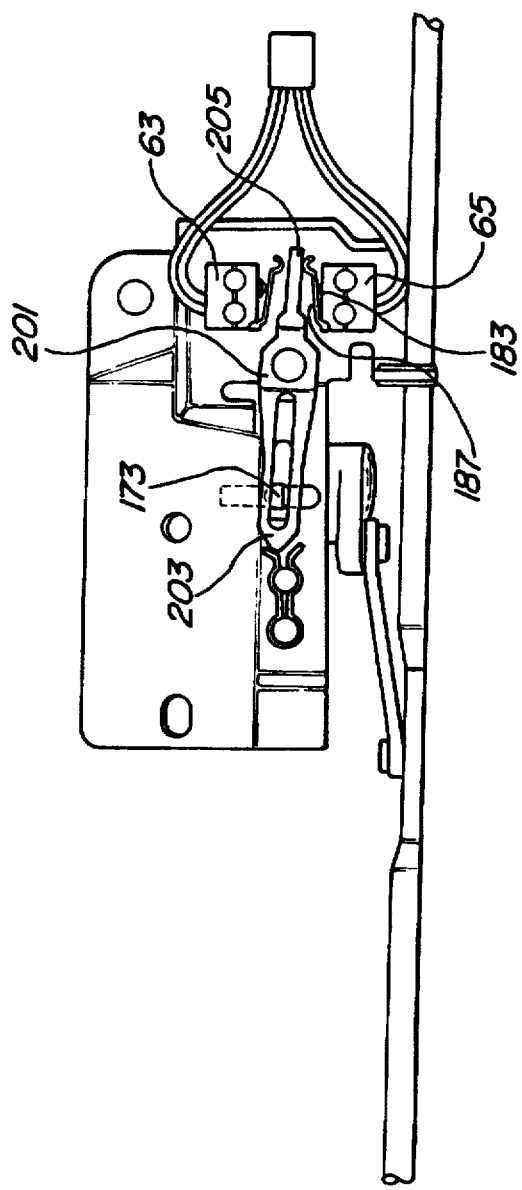
FIG. 7 is a top elevational view showing the central portion of the preferred embodiment latching and switch operating system of the present invention of the prior figures, disposed in a switch operating position.

Switches 63 and 65 are preferably single pole, single throw off-the-shelf switches having a plastic housing 181, a plunger 183, a wire pigtail 185 and internally located conductive contacts (not shown). Such switches can be purchased from Burgess-Saia Inc. of Illinois or from Cherry Electrical Products Co. of Wisconsin. Each switch further has a spring steel arm 187 positioned adjacent to the inwardly movable plunger 183. Inward movement of plunger 183 closes the conductive contacts thereby completing an electrical circuit. Switches 63 and 65 are both screwed to switch mounting plate 83 of bracket 61. A stainless steel stamped armature 201 is rotatably riveted to switch mounting plate 83 of bracket 61 such that an offset section 203 having an elongated slot therein traps and moves with finger 173 when handle 67 is moved in the fore and aft direction. This is best illustrated in FIGS. 6 and 7. Rotation of armature 201 will thereby cause a projecting section 205 thereof to selectively depress arm 187 and plunger 183 of either switch 63 or 65. A forcated spring steel biasing member 207 is fastened upon return flange 87 of bracket 61 through use of shoulder rivets. Biasing member 207 engages a distal end of offset section 203 to assist armature 201, plunger 183 and handle 67 in returning back to their neutral and nonactivated positions. A T-shaped slot within return flange 87 further serves to guide finger 173 during movement.

Latch linkage device 69 preferably consists of an idler link 301 pivotably attached to handle 67 and a single elongated rod 303 pivotably attached to idler link 301. Shoulder rivets are used for these attachments. Idler link 301 is made from stamped, high strength steel and rod 303 is made from partially flattened, round stock, high strength steel. Rod 303 has a flattened medial portion 305 and flattened ends 307. A plastic yoke 309 fits within a cutout of isolator support 89 thereby defining a rod isolator. A portion of rod 303 rides within yoke 309. Yoke 309 serves to discourage undesired bending deformation of rod 303 upon pushing of a portion thereof. Alternately, the isolator may be a separately constructed part from bracket 61 such that it can be remotely positioned. Linkage device 69 can alternately be replaced with other mechanical coupling means such as a handle directly connected to a single rod, multiple linkages and rods, a rack and pinion mechanism, one or more cables, a set of gears, a bellcrank and linkage mechanism, sprockets and chains, belts, or the like.

Referring now to FIGS. 3-5, 11 and 12, the preferred embodiment of outboard portion 39 of the present invention latching and switch operating system 31 is comprised of a first latch 401 and a second latch 403, each of which are captured by a retainer 405. Retainer 405 is preferably an injection molded high temperature, engineering grade plastic piece that is bolted to the lower portion of front header 33. Each latch 401 and 403 has an outboard body segment 411 and an inboard body segment 413 with a uniformly square cross sectional shape and a taper 415 on a distal end thereof. Each latch 401 and 403 has a flat 417 on a proximal inboard end thereof for fastening to the corresponding flat 307 of rod 303 by shoulder bolts. Latch 401 has a declining engagement surface 431 with a leading segment 433 pointing toward the vehicle centerline. A notched away segment 435 is longitudinally disposed between leading segment 433 and inboard body segment 413. Latch 403 has a declining engaging surface 441 and a leading segment 443 pointing away from the vehicle centerline such that a notched away segment 445 is located between leading segment 443 and outboard body segment 411. Each outboard body segment 411 further has a backdraft ramp or interlock surface 447 that provides an engaged interlock with strikers 451.

A pair of metallic strikers 451 are mounted to a front roof bow of convertible roof 57. Each striker 451 has a substantially horizontal catch 453 accessible in a crosscar direction. Strikers 451 are insertable through openings 501 of retainer 405 and through notched away segments 435 and 445 of their respective latches 401 and 403 when handle 67 is pivoted to its vertical unlatched position so that latches are linearly slid to their disengaged positions (see FIGS. 5 and 12). After strikers 451 have been inserted, handle 67 is then pivoted back to its stowed and latched position such that latch 401 is pulled to its engaged position and latch 403 is pushed to its engaged position. When moved toward their engaged positions, engagement surfaces 431 and 441 pull down and secure catch 453 of each striker 451 securely to front header 33. Catches 453 are interlocked along surfaces 447 when latches 401 and 403 are in their fully engaged positions. Of course, the latching and switch operating system of the present invention can be alternately mounted upon the convertible roof with the strikers extending upward or rearward from the front header. Also, the handle can be located in a remote location such as a floor center console or the like wherein the latches can be pushed and pulled through a somewhat flexible cable system. Furthermore, the latches may be located below a pivotable or slidable rigid tonneau cover, trunk lid, stationary tulip panel or quarter panels for engagement with strikers projecting from a five bow or rear hard-top roof section.

A garnish molding 601, illustrated in FIGS. 4 and 11, serves to aesthetically cover the center and outboard portions of the present invention latching and switch operating system 31. This garnish molding 601 can be retained to header 33 through various known techniques such as plastic Christmas tree fasteners, screws or metal clips. Garnish molding 601 further has a recessed pocket 603 within which handle 67 is stowed. This provides an aesthetically attractive flush appearance between handle 67 and garnish molding 601.

Figure 14:
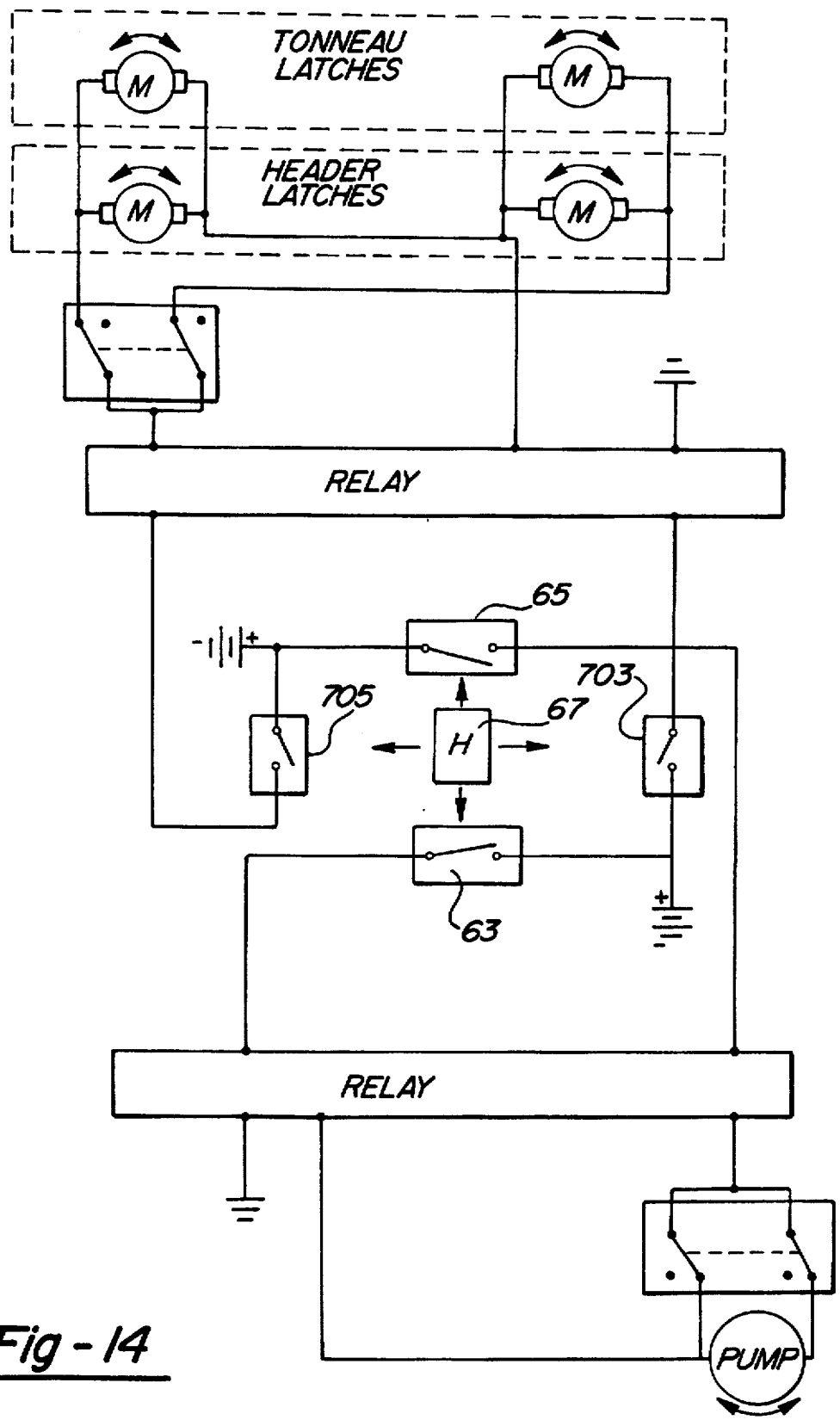
FIG. 14 is an electrical schematic diagram showing the alternate embodiment latching and switch operating system of the present invention of FIG. 10.

Referring now to FIGS. 6, 7 and 14, rearward pulling of gripping portion of handle 67 in a fore and aft vertical manner causes finger 173 to push offset section 203 of armature 201, which in turn rotates projecting segment 205 to depress arm 187 and plunger 183 of switch 65. Switch 65 then allows electrical current to flow from a full time power supply 502 to a normally open relay 503. Relay 503 is then closed thereby allowing current from a secondary power circuit to travel through a double pole, double throw bypass switch 505 and then onto a pair of electromechanical motors 507. Electromechanical motors 507 are symmetrically mounted within the quarter panels to drive a top stack driving mechanism to a retracted and stowed position below the tonneau cover in the boot well. Hydraulic actuation may be used instead of the motors. The top stack driving mechanism consists of balance links, sector gears, rear roof rails or the like. Alternately, when handle 67 is forwardly pushed in a fore and aft manner, finger 173 causes armature 201 to depress the arm and plunger of switch 63. This provides a reversal of electric current or polarity to motors 507 such that the convertible roof is moved to its raised position covering the passenger compartment.

Figure 10:
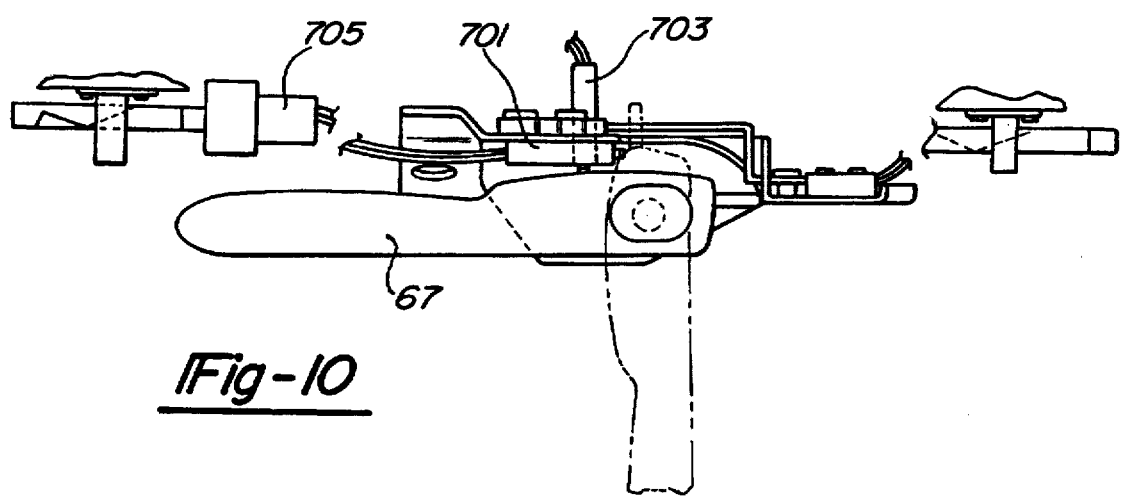
FIG. 10 is a rear elevational view, with portions broken away therefrom, showing an alternate embodiment of the latching and switch operating system of the present invention.

An alternate embodiment of the present invention latching and switch operating system is illustrated in FIGS. 10 and 14. In this alternate embodiment, handle 67 operates a pair of switches 701 and 703 through movement in a crosscar pivoting manner. Switches 701 and 703 control one centrally mounted motor 705 (FIG. 10), a pair of latch actuating motors remotely located on the front header, and/or a pair of latch motors remotely located on the tonneau cover. The switches connected to the top stack driving motors or pump previously described with the preferred embodiment can also be incorporated herewith. Of course, a single switch and position sensing potentiometers or the like may operably activate and control engaging and disengaging movement of a pair of latches whether located on the header or tonneau cover. Similarly, a single switch and potentiometers can activate and control raising and lowering movement of the convertible roof.

While the preferred embodiment of this latching and switch operating system has been disclosed, it will be appreciated that various modifications may be made without departing from the present invention. For example, the convertible roof driving electromagnetic devices and/or the latch electromechanical activating devices may be switched on and off through use of various other handle position sensing devices such as single or multiple potentiometers, rheostats, programmed microprocessors, capacitive sensors, magnetic sensors, piezo-electric sensors, or the like. Furthermore, an electric motor actuator or solenoid actuator can replace the disclosed handle actuator when employed in combination with the present invention latch linkage device or latches. Differing electrical circuits and control systems can also be employed to operate the previously disclosed electromechanical devices. These electromechanical devices may further consist of solenoids, electromagnets, etc. The shapes and interactions between the latches and strikers may be varied. For example, the pivoting handle and single rod coupled thereto may serve to rotate a pair of hook-like latches. The engagement surfaces of the latches may also have other hook-like or rounded configurations thereto. Additionally, the handle may slide rather than pivot in a crosscar manner. Moreover, any combination of the previously disclosed alternate constructions may be combined together. Various materials have been disclosed in an exemplary fashion, however, other materials may of course be employed. It is intended by the following claims to cover these and any other departures from the disclosed embodiments which fall within the true spirit of this invention.

The invention claimed is:

1. In combination, a latching system and a convertible roof of an automotive vehicle, said latching system comprising:

a first striker having a catch;

a first latch having an engagement surface, said engagement surface declining in a substantially crosscar direction with a leading segment pointing toward a centerline of said automotive vehicle, said engagement surface selectively engaging said catch of said first striker upon selective crosscar movement of said first latch toward said centerline of said automotive vehicle, said engagement surface of said first latch selectively disengaging from said catch of said first striker upon selective crosscar movement away from said centerline of said automotive vehicle;

a second striker having a catch; and a second latch having an engagement surface, said engagement surface declining in a substantially crosscar direction with a leading segment pointing away from a centerline of said automotive vehicle, said engagement surface selectively engaging said catch of said second striker upon selective crosscar movement of said second latch away from said centerline of said automotive vehicle, said engagement surface of said latch selectively disengaging from said catch of said second striker upon selective crosscar movement toward said centerline of said automotive vehicle.

2. The latching system of claim 1 further comprising a single actuator mechanically coupled to said first and second latches for causing simultaneous selective engaging and disengaging movement upon operation of said actuator.

3. The latching system of claim 2 further comprising a latch linkage device coupling said first and second latches with said actuator, said latch linkage device pulling said first latch and pushing said second latch to cause said engagement surfaces to engage with said catches of said first and second strikers, respectively.

4. The latching system of claim 3 where in said latch linkage device includes a single rod with flattened ends fastened to corresponding flattened ends on said first and second latches.

5. The latching system of claim 4 further comprising an isolator having a yoke within which said rod can slide, said isolator discouraging bending deformation of said rod upon pushing of a portion of said rod.

6. The latching system of claim 2 wherein said actuator includes a handle pivotable from a stowed position to an unlatching position.

7. The latching system of claim 6 further comprising:

a garnish molding having a recessed pocket for receiving said handle when said handle is disposed in said stowed position, said first and second latches being located in engaged positions when said handle is disposed in said stowed position, said first and second latches being located in disengaged positions when said handle is disposed in said unlatched position.

8. The latching system of claim 6 further comprising:

a rod coupling said first latch to said second latch; and an idler link coupling said handle to said rod.

9. The latching system of claim 2 wherein said actuator includes an electric motor.

10. The latching system of claim 1 further comprising a front header of said automotive vehicle and a forward portion of said convertible roof, wherein:

said first and second latches are slidably mounted upon said front header; and said first and second strikers are mounted upon said forward portion of said convertible roof.

11. The latching system of claim 10 further comprising a garnish molding aesthetically covering a surface of said front header, said first and second latches being disposed between said garnish molding and said front header.

12. The latching system of claim 1 wherein said convertible roof is a retractable soft top roof.

13. The latching system of claim 1 wherein said convertible roof is a foldable hard top roof having rigid front and rear hard-top roof sections.

14. The latching system of claim 1 wherein each of said first and second latches include:

inboard and outboard body segments;

an interlocking surface disposed on each of said outboard body segments.

15. The latching system of claim 1 further comprising:

a first actuator mechanically coupled to said first latch;

a second actuator mechanically coupled to said second latch;

a member selected from the group consisting of a front header, a tonneau cover, tulip panel, quarter panels and a trunk lid; and both of said latches being mounted on said member.

16. The latching system of claim 1 further comprising:

a body of said automotive vehicle;

a rigid tonneau cover movable in relation to said body, said tonneau cover having apertures;

said first and second latches being disposed adjacent to a lower surface of said tonneau cover; and a rear structural portion of said convertible roof;

said first and second strikers being mounted to said rear structural portion and insertable through said apertures in said tonneau cover.

17. An automotive vehicle having a convertible roof and a latching system, said latching system comprising:

a first latch having an engagement surface for engaging a first striker, said engagement surface declining in a substantially crosscar direction with a leading segment pointing toward a centerline of said automotive vehicle; and a second latch having an engagement surface for engaging a second striker, said engagement surface declining in a substantially crosscar direction with a leading segment pointing away from said centerline of said automotive vehicle.

18. The latching system of claim 17 further comprising a single actuator mechanically coupled to said first and second latches for causing simultaneous selective engaging and disengaging movement upon operation of said actuator.

19. The latching system of claim 18 further comprising catches of said first and second strikers, a latch linkage device coupling said first and second latches with said actuator, said latch linkage device pulling said first latch and pushing said second latch to cause said engagement surfaces to engage with said catches of said first and second strikers, respectively.

20. The latching system of claim 19 wherein said latch linkage device includes a single rod with flattened ends fastened to corresponding flattened ends on said first and second latches.

21. The latching system of claim 18 wherein said actuator includes a handle pivotable from a stowed position to an unlatching position.

22. The latching system of claim 18 wherein said actuator includes an electric motor.

23. The latching system of claim 17 further comprising a front header of said automotive vehicle and a forward portion of said convertible roof, wherein:

said first and second latches are slidably mounted upon said front header; and said first and second strikers are mounted upon said forward portion of said convertible roof.

24. The latching system of claim 17 wherein each of said first and second latches include:

inboard and outboard body segments; a notched away segment and said engagement surface located between said inboard and outboard body segments; and an interlocking surface disposed on each of said outboard body segments.

25. The latching system of claim 17 further comprising:
a first actuator mechanically coupled to said first latch;
a second actuator mechanically coupled to said second latch;
a member selected from the group consisting of a front header, a tonneau cover, tulip panel, quarter panels and a trunk lid; and
both of said latches being mounted on said member.

26. The latching system of claim 17 further comprising:
a body of said automotive vehicle;
a rigid tonneau cover movable in relation to said body, said tonneau cover having apertures;
said first and second latches disposed adjacent to a lower surface of said tonneau cover; and
a rear structural portion of said convertible roof;
said first and second strikers being mounted to said rear structural portion and insertable through said apertures in said tonneau cover.

27. A latch comprising:
an outboard body segment;
an inboard body segment;
a median segment having a notched segment disposed longitudinally between said outboard and inboard body segments;
a declining wedge shaped segment longitudinally disposed between said outboard and inboard body segments adjacent to said notched segment;
an interlock surface intersecting and inclining away from said wedge shaped segment so as to define a substantially downwardly pointing V-shape; and
a coupling segment disposed adjacent to said inboard body segment.

28. The latch of claim 27 being linearly slidable in a longitudinal direction.

29. The latch of claim 28 further comprising:
a second latch having a longitudinally aligned coupling segment, an inboard body segment and a wedge shaped segment; and
a single mechanical means coupling said coupling segments of said latches together for simultaneous movement.

30. The latch of claim 27 wherein said wedge points toward said coupling segment.

31. The latch of claim 27 wherein said wedge points away from said coupling segment.

32. The latch of claim 27 further comprising a striker, wherein said notched away segment is open to allow substantially vertical passage of said striker between said wedge shaped segment and one of said body segments.

33. A method of latching a convertible roof to an automotive vehicle having an actuator, a first latch, a first striker, a second latch and a second striker, said method comprising the steps of:
(a) operating said actuator;
(b) pulling said first latch toward a centerline of said automotive vehicle to engage said first striker; and
(c) pushing said second latch away from said centerline of said automotive vehicle to engage said second striker.

34. The method of claim 33 further comprising the steps of:
(a) mechanically coupling said actuator to said latches, said actuator being a handle; and
(b) pivoting said handle from a substantially horizontal stowed position to a substantially vertical unlatched position thereby simultaneously sliding said latches from said engaging positions to said disengaging positions.

35. A method of operating a pair of latches within an automotive vehicle, said automotive vehicle having an actuator, a first latch, a second latch, a first striker and a second striker, said method comprising the steps of:
(a) moving said actuator from an unlatched position to a latched position;
(b) sliding said first latch toward a centerline of said automotive vehicle in a linear manner thereby engaging said first striker; and
(c) sliding said second latch away from said centerline of said automotive vehicle in a linear manner simultaneous with step (b) thereby engaging said second striker.

36. The method of claim 35 further comprising the steps of:
(a) mechanically coupling said actuator to said latches, said actuator being a handle; and
(b) pivoting said handle from a substantially horizontal stowed position to a substantially vertical unlatched position thereby simultaneously sliding said latches from said engaging positions to said disengaging positions.

37. The method of claim 35 further comprising the sequential steps of:
(a) moving said handle from said substantially vertical position to a third position;
(b) operating an electric switch through movement of said handle; and
(c) actuating a driving mechanism electrically connected to said switch to raise said convertible roof from a stowed position to a raised position.

38. The method of claim 35 further comprising the steps of:
(a) mounting said first and second latches upon a front header of said automotive vehicle; and
(b) mounting said first and second strikers upon a convertible roof of said automotive vehicle.

39. The method of claim 35 further comprising the steps of:
(a) mounting said first and second latches upon a tonneau cover of said automotive vehicle; and
(b) mounting said first and second strikers upon a rear portion of a convertible roof of said automotive vehicle.

* * * * *

UNITED STATES PATENT AND TRADEMARK OFFICE
CERTIFICATE OF CORRECTION

PATENT NO. : 5,755,467
DATED : May 26, 1998
INVENTOR(S) : Christopher J. Dilluvio; Kim E. Taylor It is certified that error appears in the above-indentified patent and that said Letters Patent is hereby corrected as shown below:

Column 1, line 27, after "issued" insert -- to --.

Column 1, line 32, "Lacking" should be -- Locking --.

Column 7, line 22, "where in" should be -- wherein --.

Column 7, lines 65, 66, insert -- a notched away segment and said engagement surface located between said inboard and outboard body segment; and --.

Column 8, line 63, begin new paragraph with "a notched away. . .".

Signed and Sealed this

Twentieth Day of October, 1998

Attest:

BRUCE LEHMAN

*Attesting Officer*       *Commissioner of Patents and Trademarks*